United States Patent
McDonagh

(10) Patent No.: US 7,876,802 B2
(45) Date of Patent: Jan. 25, 2011

(54) HIGH GAIN TAPERED LASER GAIN MODULE

(75) Inventor: Louis McDonagh, Kaiserslautern (DE)

(73) Assignee: Lumera Laser GmbH, Kaiserslautern (DE)

( * ) Notice: Subject to any disclaimer, the term of this patent is extended or adjusted under 35 U.S.C. 154(b) by 190 days.

(21) Appl. No.: 10/915,094

(22) Filed: Aug. 10, 2004

(65) Prior Publication Data

US 2005/0036532 A1  Feb. 17, 2005

(30) Foreign Application Priority Data

Aug. 11, 2003  (EP) .................................. 03017630

(51) Int. Cl.
*H01S 3/094* (2006.01)
*H01S 3/13* (2006.01)

(52) U.S. Cl. ..................................... 372/71; 372/29.021

(58) Field of Classification Search ................... 372/71, 372/29.021
See application file for complete search history.

(56) References Cited

U.S. PATENT DOCUMENTS

| 4,731,795 | A |   | 3/1988  | Clark et al. |        |
|-----------|---|---|---------|--------------|--------|
| 5,187,759 | A | * | 2/1993  | DiGiovanni et al. | 385/27 |
| 5,268,787 | A |   | 12/1993 | McIntyre     |        |
| 5,812,308 | A |   | 9/1998  | Kafka et al. |        |
| 6,144,484 | A |   | 11/2000 | Marshall     |        |
| 6,185,235 | B1|   | 2/2001  | Cheng et al. |        |
| 6,417,955 | B1| * | 7/2002  | Kafka et al. | 359/333|
| 6,553,052 | B1|   | 4/2003  | Ireland      |        |
| 2002/0018288 | A1| * | 2/2002 | Rieger et al. | 359/342|

FOREIGN PATENT DOCUMENTS

EP  0 352 059 A2  1/1990
JP  05063264  12/1993

OTHER PUBLICATIONS

Forget S., Balembois F., Georges P., and Devilder P.J., "A new 3D multipass amplifier based on Nd:YAG or NdYVO$_4$ crystals", *Applied Physics B* (2002) pp. 481-485.

Nebel A., Ruffing B., and Wallenstein R., "A high power diode-pumped all-solid-state RGB laser source", May 3, 1998.

* cited by examiner

*Primary Examiner*—Tod Van Roy
*Assistant Examiner*—Marcia A. Golub-Miller

(57) ABSTRACT

The present invention describes an optically end-pumped laser gain module, comprising a gain medium which is pumped by a light beam that has a larger size on the input face of the medium than on its output face.

7 Claims, 6 Drawing Sheets

HIGH GAIN TAPERED LASER GAIN MODULE

FIELD OF THE INVENTION

The present invention relates to the field of lasers, and in particular to high gain and high power laser oscillators and amplifiers.

BACKGROUND OF THE INVENTION

As lasers are finding more and more applications in research, industry and medicine among other fields, many uses would benefit from sources of increased power, simplicity or even compactness. However, designing a high power laser oscillator producing the desired spatial (beam quality, fundamental mode operation), temporal (pulse length, pulse repetition frequency) and spectral characteristics (spectral bandwidth) along with stable low-noise operation is often very difficult, if not impossible with the currently available technology.

One solution to realize a laser possessing many of these characteristics and producing a diffraction-limited output beam is to optically end-pump a solid-state laser material. The pump laser diode's output can be transmitted to the crystal through a series of optics and lenses, or delivered to the focusing optics through an optical fiber. The latter solution is often used for it provides a round homogenized beam allowing an optimal pump/laser mode matching. The fiber's output face is then imaged on or close to the front face of the laser medium. The choice of the pump spot's diameter is determined by the size of the mode in the laser medium, as the two should be of about the same size for efficient energy extraction. In turn, the laser mode and pump spot should be kept small enough to match the size of the $TEM_{00}$ mode in the gain medium, also insuring a high gain, which generally favors the desired output characteristics (low noise, short Q-Switched or mode-locked pulses, lower sensitivity to environmental influences). Lowering the laser medium's gain will increase the lasing threshold, which will generally result in higher noise, longer build-up time and pulse length for Q-switch oscillators and longer pulses for mode-locked oscillators. This choice of pump/mode size therefore limits the amount of pump power that can be applied on a given surface before thermal effects, excessive thermal lensing, bulging of the front surface and ultimately fracture of the medium occur. The gain and the power that can be extracted from the laser medium in a $TEM_{00}$ beam are therefore limited. One way of increasing this limit is to reduce the pump absorption in the gain medium, spreading the absorption on a longer length. This is usually achieved by reducing the material's doping level. This technique and various embodiments are described in Cheng et al., "Lasers with low doped gain medium", U.S. Pat. No. 6,185,235. However, the absorption should be adapted so that most of the pump light is absorbed in a region where the pump beam overlaps the laser mode. Unfortunately, the pump laser diode's low beam quality compared to the laser mode limits this absorption to a fraction of the gain medium's length. All the pump radiation that is not absorbed within this short length diverges out of the $TEM_{00}$ fundamental laser mode and is therefore wasted for the amplification process, potentially allowing high order modes to oscillate. For this reason, the maximum output power available in a diffraction limited beam is limited.

One way of further increasing the output power is through a Master Oscillator Power Amplifier (MOPA) system. It consists of a low or medium power oscillator possessing the desired characteristics previously mentioned (spatial, temporal and spectral characteristics), followed by one or several amplification stages. Those should raise the power of the laser beam, while maintaining spatial, temporal and spectral characteristics. As for a laser oscillator, a limit in applicable pump power arises from the physical limits of the laser medium, before thermally-induced distortions and ultimately the medium's fracture occur. The choice of the pump spot's diameter in the amplifier is determined by the size of the seed beam in the laser medium, as the two should be about the same size for efficient energy extraction. In turn, the seed beam should be kept small enough to reach or approach saturation intensity, insuring efficient extraction of the pump energy. This choice then limits the amount of pump power that can be applied on a given surface before thermal effects, excessive thermal lensing, bulging of the front surface and ultimately fracture of the medium occur. The gain factor and the power that can be extracted from the amplifier are therefore limited. As previously described for an oscillator, the reduction of the pump absorption and therefore the increase in the absorption length allows to further extend the pump power limit before undesirable thermo-optical effects occur. However, the absorption should be adapted so that most of the pump light is absorbed in a region where the pump beam overlaps the seed beam. Unfortunately, the low pump beam quality with regard to the seed beam limits this absorption to a fraction of the gain medium's length. All the pump radiation that is not absorbed within this short length diverges out of the seed beam and is therefore wasted for the amplification process. Consequently, the overall extraction efficiency for a diffraction-limited seed beam is reduced. Also, the undepleated pumped regions may lead to parasitic oscillations or amplified spontaneous emission which would reduce the efficiency of the amplification process.

Such a system has been build, which amplifies a medium power mode-locked oscillator (about 4 W) to a higher output power (42 W), as described in Nebel et al., post deadline paper CPD3, CLEO 1998. Such a high gain factor is achieved through a series of amplification stages. Each of those consist of a Neodymium-Vanadate crystal, which is end-pumped by two fiber-coupled laser diode bars. Although such scheme gives good performance, the gain factor of each stage is limited, thus requiring the use of several amplification stages in series. As the components (fiber coupled diodes, crystals, relaying optics) are expensive, the complexity and the cost of such a system prevents it from being applied to a reliable, cost effective product.

Other systems have been built (Marshall, U.S. Pat. No. 6,144,484), which amplify a seed beam ranging from a power of 100 milliwatts to 10 watts, with a maximum gain factor of two. Undoped end-caps are diffusion bonded to the crystal's ends to act as a thermal reservoir, extracting the heat generated by the absorption of the pump light in the doped region of the crystal, while not absorbing the pump light itself. This leads to a reduced pump-induced bulging of the crystal and a lower temperature of the crystal's pumped volume than with free-standing ends. This results in reduced and less aberrated thermal lensing, ultimately increasing the maximum applicable pump power. However this is just an improvement to classic end-pumping, allowing slightly higher power to be applied to the crystal, but the amplifier's maximum gain factor is still limited to about two. Furthermore the cost and the limited availability of such crystals with diffusion bonded end-caps limits their use in a product.

Yet another system has been build, which amplifies a medium power beam to a high power output, as described in Kafka et al., U.S. Pat. No. 6,417,955. The amplification is achieved in a 12 mm-long, very low-doped (0.15% atm.) Vanadate crystal, that is end pumped by a laser diode stack. The pump light is homogenized and delivered from the diode stack to the crystal through the use of a gold-plated hollow funnel. Pump powers of almost 175 W are applied to the crystal, leading to over 55 W of output power. Although the concept is simple and requires few components, conserving high beam quality along with a high gain factor will be an issue. This is because tight focusing of the pump will be required to achieve high gain along with efficient extraction, leading to thermally induced beam distortions. Furthermore, care must be taken to design or select a pump-light delivery system that forms a homogeneous pump spot, avoiding hot-spots or gain inhomogeneities that would distort the seed beam profile during amplification. Besides, this concept does not apply to lower power systems, much better adapted to fiber-coupled or beam-shaped single bar pump schemes.

Another solution for achieving a high gain amplifier is to multi-pass the seed beam through the gain medium. The seed beam is made bigger than what would be required for efficient extraction in single pass, thus requiring a bigger pump spot and therefore allowing to apply higher pump power. The low intensity seed beam is then passed several times through the pumped region, summing the low extraction of each pass to reach high global extraction efficiency. Such a system is described in Kafka et al., U.S. Pat. No. 5,812,308, including a 1.8 W mode-locked oscillator that is amplified to 6 W in a single end-pumped 4-pass vanadate amplifier. Although a gain factor of over 3 is achieved, scaling the setup to higher power would require reducing the crystal's doping and conversely increasing its length. Thus maintaining a good overlap between the four passes and the pump volume would be difficult to achieve on the whole length of the crystal, while conserving a diffraction limited output beam.

Yet another system has been build, which amplifies a low power source to a medium power output, achieving a high gain factor of over 50. Several setups, including Nd:YAG and Nd:YVO$_4$ based amplifiers are described in Forget et al., Applied Physics B, Lasers and Optics, 2002. The output of a microchip laser of about 100 mW is amplified to over 5 W in a 3D multi-pass scheme. However, such a system is complicated and requires many optical components for obtaining best performance. Furthermore, as with the 4-pass amplifier mentioned above, scaling to higher power and keeping good pump/seed mode matching in a longer crystal would be an issue when a diffraction limited output beam is desired.

Unlike in the approach according to the present invention, conventional end pumping requires high absorption of the pump light close to its input face, before the pump beam's size increases too much due to divergence, thus loosing signal/pump mode-matching. All the pump light absorbed in the volume surrounding the signal mode is therefore wasted and doesn't participate to its amplification when TEM$_{00}$ operation is desired. Such requirement on high absorption limits the amount of pump power that can be applied to the laser medium for a certain mode size. An increase in pump power will create effects such as thermal lensing, aberrations and bulging of the crystal's front face, effectively distorting the signal beam, and ultimately leading to the crystal's fracture. It is therefore not possible to achieve a high power and high extraction efficiency laser amplifier with such conventional end-pumping technique, while maintaining the high beam quality of a TEM$_{00}$ or near diffraction-limited beam. Therefore there is a need for a simple high gain and high extraction efficiency gain module concept to be used in a high beam quality laser oscillator or amplifier that could be applied to different signal and pump power ranges. The use of a single high power oscillator in place of a MOPA system, or of a single amplifier in place of multi-stage or multi-pass schemes would allow reducing costs and complexity, thus leading to more competitive and reliable products.

There is a further need for an end-pumping scheme that allows increasing the pump absorption length, and therefore the pump power, while maintaining a good overlap with the seed beam.

SUMMARY OF THE INVENTION

The technical problem underlying the present invention is to provide a high gain and high power end-pumped laser oscillator or laser amplifier.

Gain modules for lasers or amplifiers which can be used to obtain high gain and high power end-pumped laser oscillators or laser amplifiers in accordance with the present invention are described in claim 1.

Preferred embodiments are disclosed in the dependent claims.

DETAILED DESCRIPTION OF THE PREFERRED EMBODIMENTS

Figure 1:
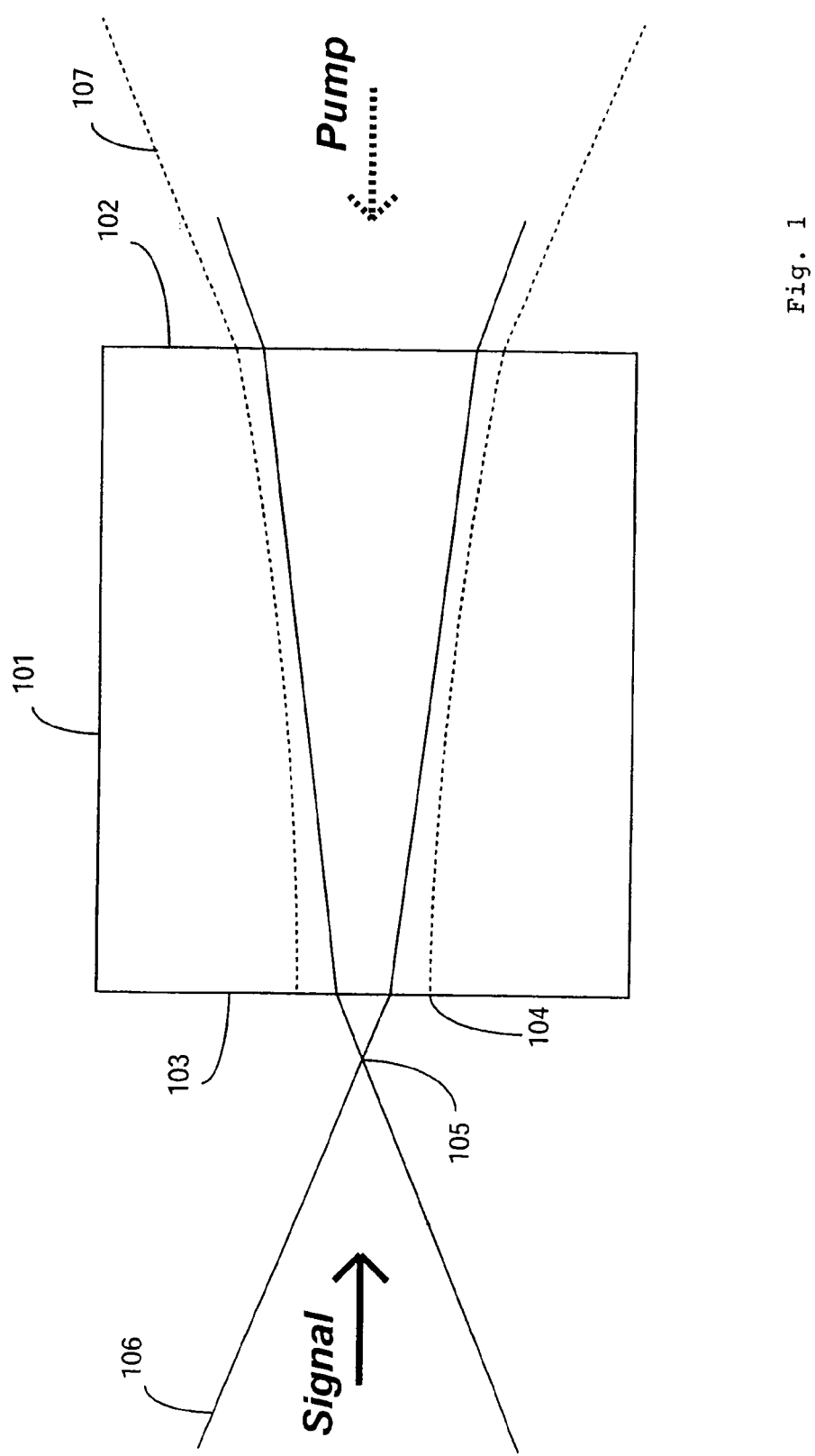
FIG. 1 is a schematic diagram of the amplifier geometry of the present invention.

FIG. 1 illustrates a basic scheme of the invention wherein a laser medium 10 is pumped from one end 102 with a beam 107, while the signal beam or laser mode 106 to be amplified enters the medium from the other end 103. The waist 104 of pump beam 107 is placed on or close to face 103. In any case, the pump beam area should be larger on its entrance face 102 than on its output face 103. The signal beam or laser mode 106 is focused in front of face 103 to achieve the desired divergence in the laser medium. Adjusting the position of the signal's waist 105 and its divergence allows optimal mode matching with the pumped volume. The laser medium will preferably but not exclusively be a solid-state medium. A variety of different solid-state gain media may be used. These include but are not limited to Nd:YAG, Nd:YLF, Nd:YVO$_4$ or Yb:YAG crystals, and Nd:glass. However a preferred embodiment will include a Nd:YVO$_4$ crystal, chosen for its high emission cross-section and natural birefringence, thus making it an ideal candidate to realizing a high gain, high power and high extraction efficiency solid-state laser oscillator or amplifier. The choice of the medium's geometry includes for example a rod, a block or a slab. Therefore the pump beam and laser mode may present a circular profile for a block or rod shaped gain medium, or an elliptical profile for a slab-shaped gain medium. In the latter case, the pump beam may be collimated or have a reduced divergence in the direction of the slab's thin dimension, and have a larger divergence in the direction of the slab's width, thus providing the pump beam's area reduction from the input to the output face. However, the following description of various embodiments of the present invention is conducted for circular beams for simplicity.

Figure 2:
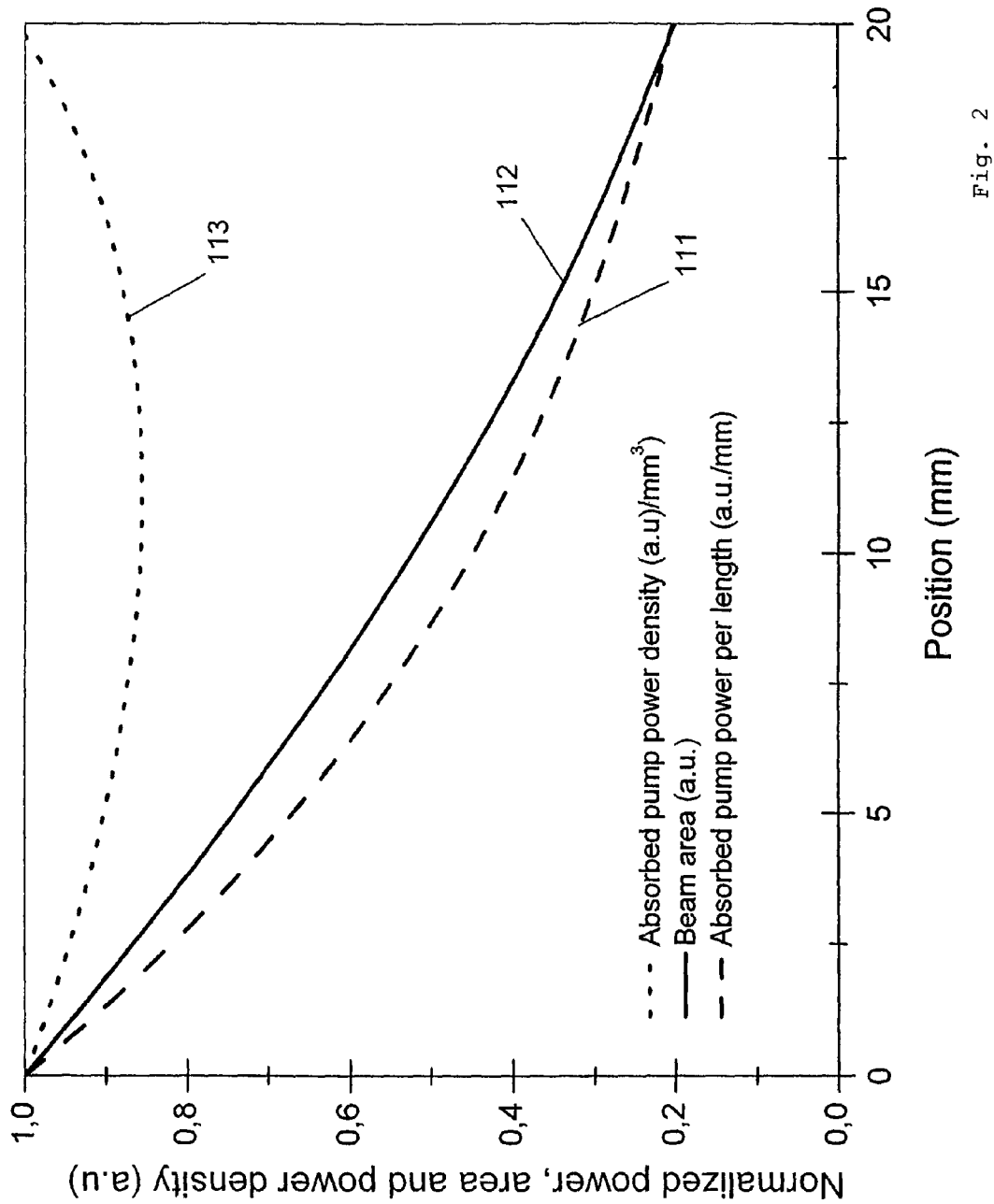
FIG. 2 is a graph representing the absorbed pump power per length, beam area and absorbed pump power density along the length of the crystal for the present invention.

The signal beam's area on face 103 is kept small enough to ensure efficient extraction right after entering the laser medium, going through a high gain pumped volume, yet the pump spot area (cross-section) on face 102 can be made much larger, allowing higher pump power to be applied with regard to conventional end-pumping, while maintaining a high laser beam quality. As the signal beam 106 travels through the gain medium, it increases in size due to its inherent divergence, and gains power due to amplification. FIG. 2 illustrates how the pump beam is focused down so that the decrease in power due to absorption is compensated by the reduction in beam area, thus insuring an almost constant pump power density. The graph presents the example of a 20 mm long gain medium 10, where the pump beam's entrance face 102 is located at the position "0 mm" and its output face 103 is located at the position "20 mm". The absorbed pump power density or gain per area 113, which is proportional to the local absorbed pump power per length 111 divided by the local beam area 112, is kept approximately constant along the whole length of the gain medium. Therefore a careful adjustment of all parameters can insure that the signal power density is kept at a sufficient level for efficient energy extraction from the entrance to the exit face of the laser medium. This particular plot describes polarized pumping or unpolarized pumping of a medium exhibiting polarization-insensitive absorption, resulting in a perfectly exponential absorption. This configuration allows optimal spreading of the absorbed pump light along the whole length of the medium, reducing the heat load on the pump entrance face compared to unpolarized pumping of a material exhibiting polarization-dependent absorption (e.g. Nd:YVO$_4$). In the latter case, most of the pump light polarized along the medium's highly absorbing axis will be absorbed close to the entrance face, leading to a high heat load. On the contrary, the light polarized along the weaker absorbing axis will take a much longer length to be absorbed, eventually leading to potential leakage out of the output face. Therefore the maximum applicable pump power is limited by the strong absorption on one axis, before thermal effects (thermal lensing, aberrations, bulging of the medium's face and eventually the medium's fracture) perturb the laser action too strongly. This specific case of polarization independent absorption illustrates the invention, as it provides the advantages cited above, namely the reach of higher applicable pump powers.

As is shown in FIGS. 1 and 2, the area of the pump beam, during its path through the gain medium 10, is reduced by a certain factor, which is preferably larger than 2, more preferably larger than 3 and even more preferably larger than 4. Furthermore, the dimensions are selected preferably such that the signal beam is, essentially along the entire path through the gain medium, overlapping or smaller in cross section than the pump beam, thus conserving the signal or the laser mode's beam quality.

The general concept of the invention is described and explained in FIG. 1 and FIG. 2. Specific embodiments are presented in FIG. 3 to FIG. 6. These illustrate several examples of integration of the invention in a laser amplifier or oscillator, all consisting of basic setups.

Figure 3:
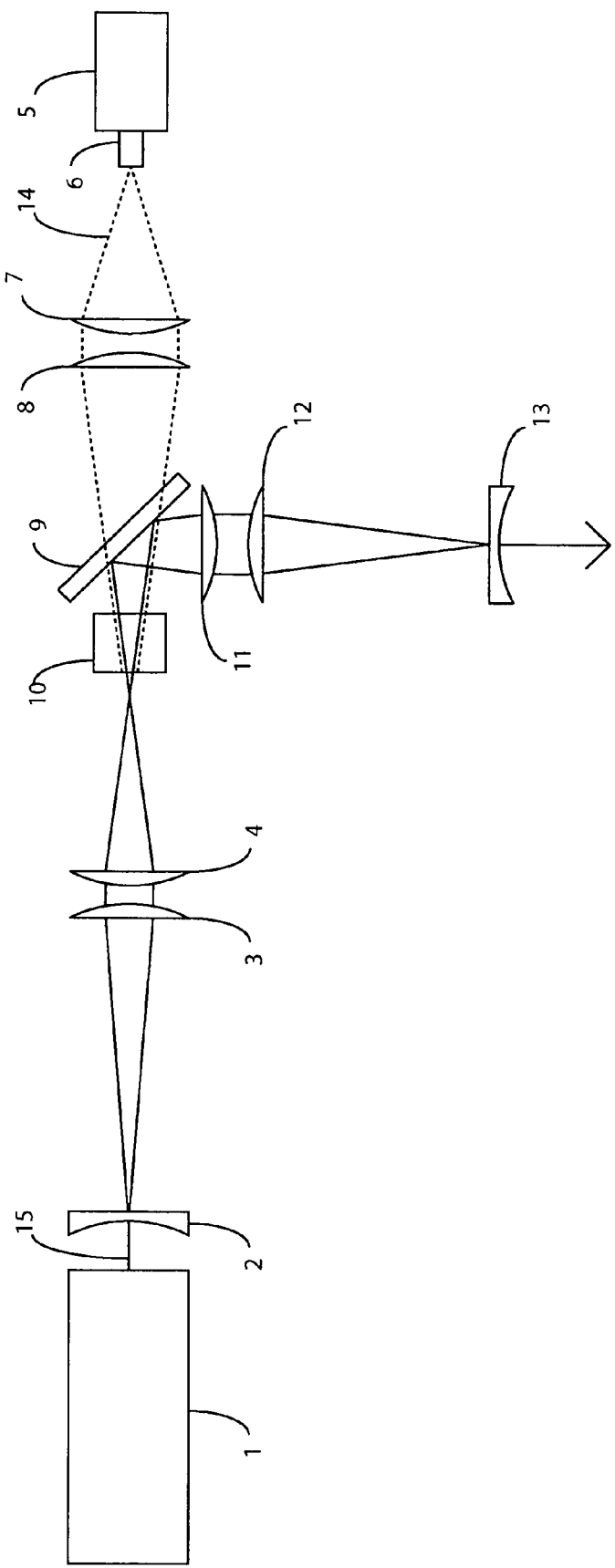
FIG. 3 is a scheme representing an embodiment of a complete MOPA system.

An embodiment of the present invention is illustrated in FIG. 3. A signal beam 15 originating from a certain laser source 1 is expanded by a diverging lens 2, then collimated by a lens 3 and finally focused by lens 4. The light 14 of a pump laser diode 5 is transmitted to the setup through a delivery system 6. This pump system can consist of, but is not limited to a fiber-coupled single diode, bar or stack, a bar or a stack with or without micro-optics or different beam shaping and homogenizing optics. Its divergent output is collimated by lens 7 and then focused by lens 8. The pump light then goes through a dichroic plate 9, which provides a high transmission at the pump wavelength along with high reflectivity at the signal wavelength on its side closer to the laser medium. The pump light and the signal both enter the gain medium 10 as described in FIG. 1. The amplified signal beam is then separated from the contra propagating pump beam by reflection on dichroic plate 9. Finally it may be reshaped or collimated to achieve the desired output beam characteristics. For example, the output beam may be collimated by lens 11 and have its diameter reduced by a reversed beam expander consisting of lens 12 and lens 13.

Figure 4:
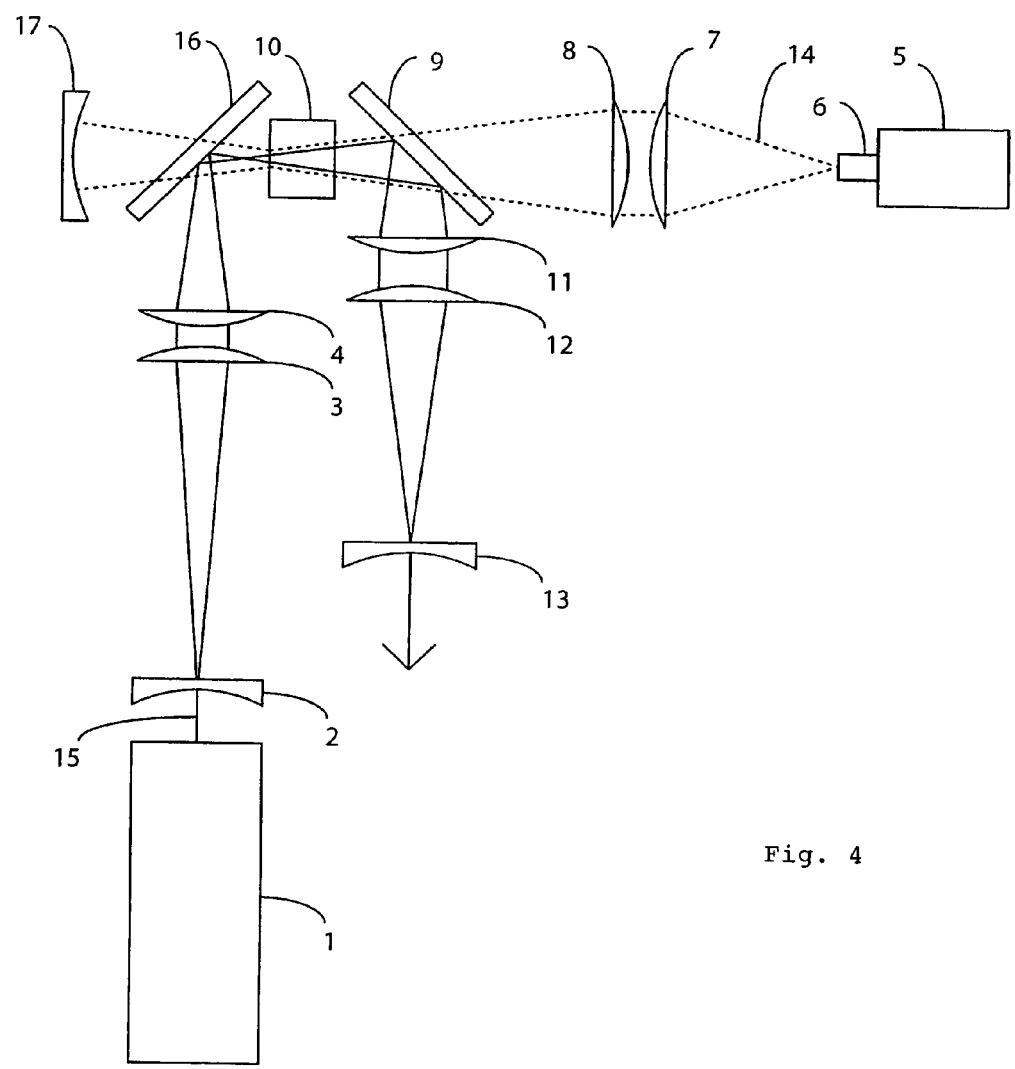
FIG. 4 is a scheme representing an embodiment of a MOPA system in which the pump light is absorbed through a double-pass.

Another possible improvement of the invention is illustrated in FIG. 4. In the figures, elements providing similar or the same functions are indicated by the same reference numerals. Although the general setup is similar to that of FIG. 3, the pump light is double-passed through the laser medium. The absorption is accordingly reduced to provide higher leakage after one pass, but the desired total absorption after the two passes. The effective absorption length is therefore doubled compared to single pass absorption of the pump for the same total absorbed power. This reduces the heat load close to the pump light entrance face, reducing thermo-optical effects such as bulging, aberrations and thermal lensing. In turn, the maximum applicable pump power may be increased compared to single pass absorption. Considering that the second pass of the pump has a smaller cross section on its input face than on its output face, care should be taken to insure that the medium's temperature, stresses and thermo-optical effects remain in an acceptable range to insure proper operation of the gain module, avoiding excessive thermal lensing and fracture of the medium. This can be made possible because the power contained in the second pass of the pump is only a fraction of the incoming pump power. The absorption of the pump light in a double pass is therefore a possible enhancement to the main concept described in FIG. 1.

A signal beam 15 originating from a certain laser source 1 is expanded by a diverging lens 2, then collimated by a lens 3 and finally focused by lens 4. A dichroic plate 16 that is highly reflective for the signal wavelength and provides high transmission for the pump wavelength reflects this focused signal beam in the crystal 10. The light 14 of a pump laser diode 5 is transmitted to the setup through a delivery system 6, which can consist of, but is not limited to an optical fiber. Its divergent output is collimated by lens 7 and then focused by lens 8. The pump light then goes through a dichroic plate 9, which provides a high transmission at the pump wavelength along with high reflectivity at the signal wavelength on its side closer to the laser medium. The pump light and the signal both enter the gain medium 10 as described in FIG. 1. The residual pump light which has not been absorbed during the first pass in the gain medium is transmitted through a second dichroic plate 16, and then retro-reflected on the same optical path by a highly reflective element for the pump light. This could be for example a curved mirror 17 or a combination of a lens and a mirror. This pump beam goes again through dichroic plate 16 before entering the gain medium 10. The amplified signal beam is separated from the pump beam by reflection on dichroic plate 9. Finally it may be reshaped or collimated to achieve the desired output beam characteristics. For example, the output beam may be collimated by lens 11 and have its diameter reduced by a reversed beam expander consisting of lens 12 and lens 13.

Figure 5:
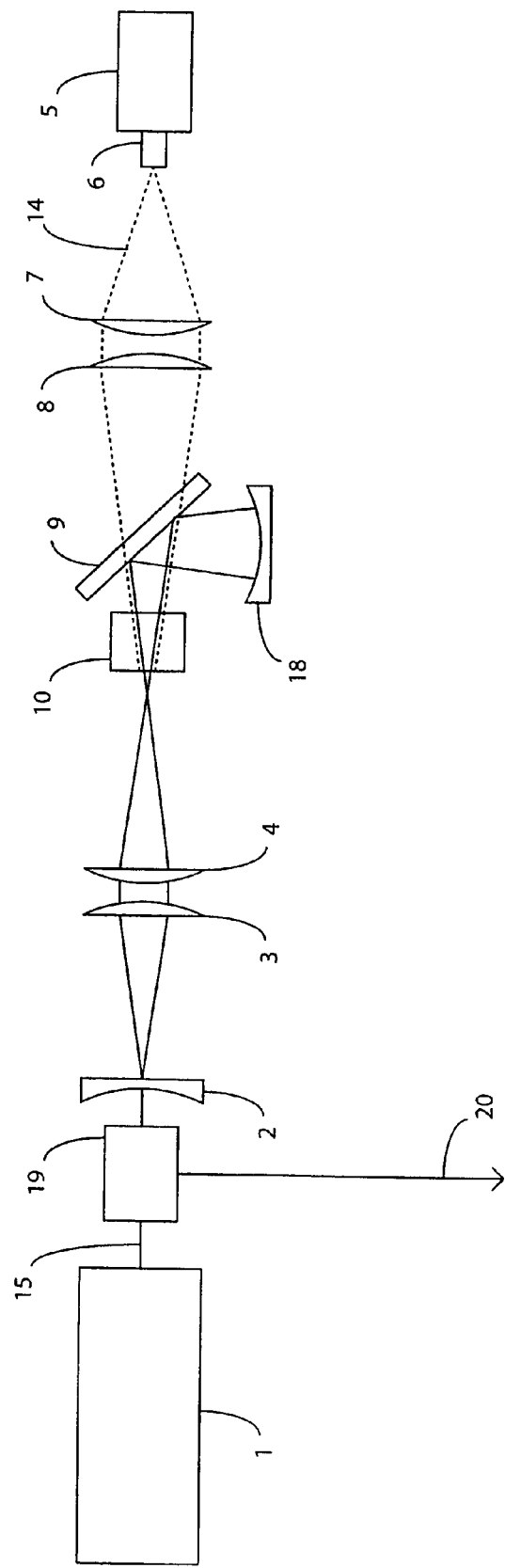
FIG. 5 is a scheme representing an embodiment of a complete MOPA system in which the seed beam is double-passed through the gain medium.

A possible further improved embodiment of the present invention is illustrated in FIG. 5. A signal beam 15 originating from a certain laser source 1 goes through an optical isolator 19, which transmits a beam polarized on a chosen axis traveling in one direction, and deflects a beam polarized on the same axis but traveling in the opposite direction. Such component is usually realized by placing a Faraday rotator in between two crossed polarizers. The transmitted beam is then expanded by a divergent lens 2, collimated by lens 3 and finally focused by lens 4. The light 14 of a pump laser diode 5 is transmitted to the setup through a delivery system 6, which can consist of, but is not limited to an optical fiber. Its divergent output is collimated by lens 7 and then focused by lens 8. The pump light then goes through a dichroic plate 9, which provides a high transmission at the pump wavelength along with high reflectivity at the signal wavelength on its side closer to the laser medium. The pump light and the signal both enter the gain medium 10 as described in FIG. 1. The amplified signal beam is then separated from the contra-propagating pump beam by reflection on dichroic plate 9. It is then retro-reflected on the same optical path by a highly reflective element for the signal light. This could be for example a curved mirror 18 or a combination of a lens and a mirror. Therefore, the seed beam is reflected on dichroic plate 9, transmitted and further amplified in laser medium 10, and then collimated through the series of optics 4, 3 and 2. The amplified beam is then spatially separated from the incident seed beam by optical isolator 19, providing an amplified output beam 20.

This system allows to further improve the energy extraction in the gain medium when the seed beam intensity isn't sufficient to reach saturation of extraction. Given a slightly increased complexity in the system design and adjustment (retro-reflection and optical isolator), one can use a larger seed beam/pump volume or a lower seed beam intensity than in a single-pass configuration, while maintaining efficient energy extraction. The double-pass absorption of the pump described in FIG. 4 may be combined with a double-pass of the signal as described in FIG. 5. This would allow combining the advantages of increased applicable pump power and reduced seed intensity for achieving efficient energy extraction.

Figure 6:
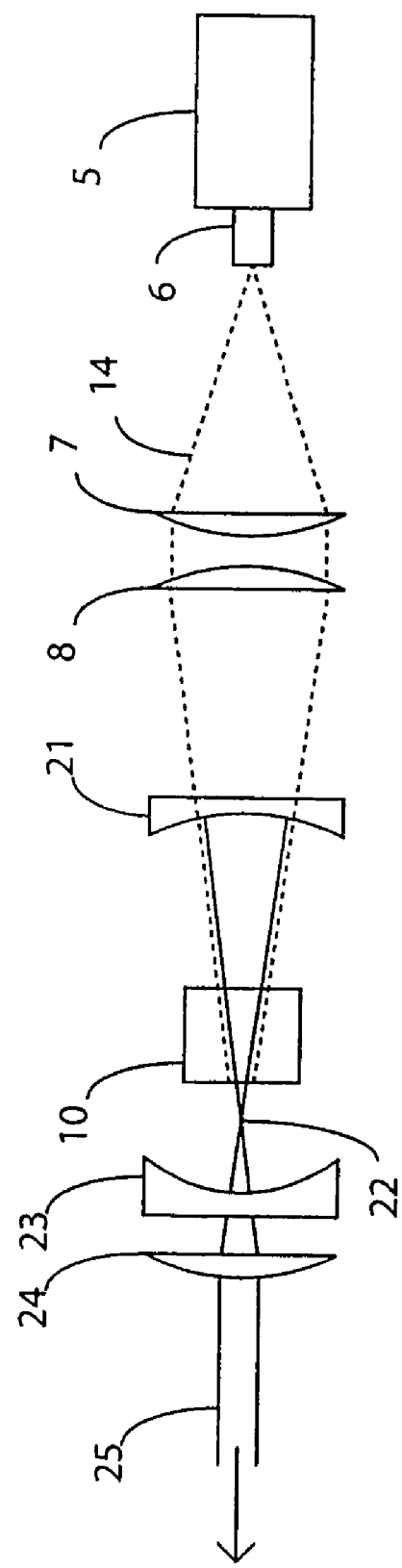
FIG. 6 is a scheme representing an embodiment of the invention in a laser oscillator.

FIG. 6 presents a basic oscillator embodiment in a simple linear resonator. Many modifications and variations will be apparent to practitioners skilled in the art. E.g. the laser cavity may comprise many optical elements, such as mirrors, lenses, polarizers, wave plates, non-linear crystals, Q-switches, mode-locking devices or other components required to achieve the desired output characteristics. The light 14 of a pump laser diode 5 is transmitted to the setup through a delivery system 6, which can consist of an optical fiber. Its divergent output is collimated by lens 7 and then focused by lens 8. The pump light then goes through a dichroic mirror 21, which provides a high transmission at the pump wavelength along with high reflectivity at the signal wavelength on its side in the resonator. It serves as the highly reflective back mirror for the resonator. Then the pump light is absorbed in the gain medium as described in FIG. 1. The resonator is formed between the back mirror 21 and the output coupler 23, which exhibits the adequate transmission for the desired output coupling. Part of the resonant laser mode 22 is coupled out of the cavity through output coupler 23. The divergent output beam may be collimated or focused by further optical elements, such as lens 24, providing an output beam 25.

Applying the pumping scheme described in FIG. 1. to an oscillator may provide the high gain and high power contributing to achieve the desired output characteristics. Generally, high gain will improve the laser's output stability, reduce noise, provide short Q-switched pulses with improved pulse-to-pulse stability or even enable short mode-locked pulses by allowing a large number of modes to oscillate. These examples are just presented to illustrate how most laser oscillators will benefit from a pumping scheme enabling high gain, and should not limit in any way the scope of the invention applied to laser oscillators.

A preferred embodiment of the present invention uses an $Nd:YVO_4$ crystal as the gain medium. This material is chosen for its well-known high emission cross-section and natural birefringence, making it a medium of choice for high gain end-pumped laser oscillators and amplifiers.

The pump source is preferably a fiber-coupled diode laser bar or stack, providing a homogenized round pump beam, and preferably of high brightness. Typical high-brightness fiber-coupled diodes available as of today include 10 W on 100 μm diameter fiber, 0.22 numerical aperture (NA); 25 W on 200 μm diameter, 0.22 NA; and even 300 W on 600 μm diameter, 0.22 NA. High pump beam quality will allow the use of longer crystals for the chosen pump beam sizes on the entrance and exit faces of the gain medium, and therefore more power to be applied.

A variety of laser oscillators may be used to provide the seed beam to the gain medium used in an amplifier setup. These include but are not limited to CW, mode-locked or Q-switched lasers. Applications requiring high power short pulses (e.g. pulses in the range of a few nanoseconds from a Q-switched laser or several picoseconds from a mode-locked oscillator) will particularly benefit from a high gain amplifier system, as achieving all the desired characteristics (e.g. high power, short pulses and high beam quality) is very difficult within one single oscillator.

The foregoing description of a preferred embodiment of the invention, including a solid-state laser material and a Vanadate crystal and fiber-coupled diode pump source, has been presented for purposes of illustration and description, putting forward the uniqueness of our approach.

What is claimed is:

1. A system for amplifying a signal laser beam, comprising:
    an optically end-pumped laser gain module, comprising a gain medium;
    pump light beam focusing optics to focus a pump light beam so that the pump light beam passes through the gain medium and has a larger size on an input face of the gain medium than on an output face of the gain medium; and
    signal laser beam focusing optics to focus a signal laser beam so that the signal laser beam is arranged to have a focus comprising a center point located outside the gain medium at a distance from the output face of the gain medium and to pass through the gain medium from the output face to the input face so that the signal laser beam has a smaller size on the output face of the gain medium than on the input face of the gain medium,
    wherein the pump light beam focusing optics and the signal laser beam focusing optics are arranged such that the signal laser beam is enclosed by the pump light beam and the size of the pump light beam is larger than the size of the signal laser beam on both the input face and the output face of the gain medium.

2. A system according to claim 1, wherein the gain module is part of a single pass laser amplifier.

3. The gain module of claim 1 used as part of a single pass laser amplifier, but in which the pump light's absorption is enhanced by a double pass through the gain medium.

4. The gain module of claim 1 used as part of a double pass laser amplifier in which the pump light is absorbed in a single pass through the gain medium.

5. The gain module of claim 1 used as part of a double pass laser amplifier in which the pump light's absorption is enhanced by a double pass through the gain medium.

6. The gain module of claim 1 used as part of a laser oscillator.

7. The gain module of claim 1 used as part of a laser oscillator in which the pump light's absorption is enhanced by a double pass through the gain medium.

* * * * *